(12) United States Patent
Hartinger et al.

(10) Patent No.: US 9,897,180 B2
(45) Date of Patent: Feb. 20, 2018

(54) 3D PUSH PULL CHAIN

(71) Applicant: IWIS Antriebssysteme GmbH & Co. KG, München (DE)

(72) Inventors: Gerhard Hartinger, Geretsried (DE); Orhan Sahin, München (DE)

(73) Assignee: IWIS Antriebssysteme GmbH & Co. KG, Munich (DE)

( * ) Notice: Subject to any disclaimer, the term of this patent is extended or adjusted under 35 U.S.C. 154(b) by 365 days.

(21) Appl. No.: 14/716,573

(22) Filed: May 19, 2015

(65) Prior Publication Data
US 2015/0337929 A1  Nov. 26, 2015

(30) Foreign Application Priority Data

May 23, 2014  (EP) ..................................... 14001818

(51) Int. Cl.
| F16H 19/00 | (2006.01) |
| F16H 19/06 | (2006.01) |
| F16G 15/00 | (2006.01) |
| F16G 13/07 | (2006.01) |
| F16G 13/20 | (2006.01) |

(52) U.S. Cl.
CPC ......... *F16H 19/0645* (2013.01); *F16G 13/07* (2013.01); *F16G 13/20* (2013.01); *F16G 15/00* (2013.01); *Y10T 74/1884* (2015.01); *Y10T 74/20* (2015.01)

(58) Field of Classification Search
CPC ...... F16H 19/0645; F16G 13/07; F16G 13/20; F16G 15/00
See application file for complete search history.

(56) References Cited

U.S. PATENT DOCUMENTS

| 2,297,813 | A | * | 10/1942 | Stork | ....................... | F16G 13/10 |
| | | | | | | 198/840 |
| 2,550,995 | A | * | 5/1951 | Gran | .................... | B65G 17/086 |
| | | | | | | 474/210 |
| 2,649,812 | A | * | 8/1953 | Wylie | .................. | B65G 17/086 |
| | | | | | | 198/852 |
| 2,893,540 | A | * | 7/1959 | Freeman | .............. | B65G 17/385 |
| | | | | | | 198/683 |

(Continued)

FOREIGN PATENT DOCUMENTS

| CN | 202091427 U | 12/2011 |
| DE | 31 23 634 A1 | 12/1982 |

(Continued)

OTHER PUBLICATIONS

Office Action in Chinese Patent Application No. 201510265244.7, dated Nov. 28, 2016.

(Continued)

*Primary Examiner* — David M Fenstermacher
(74) *Attorney, Agent, or Firm* — Baker & Hostetler LLP

(57) ABSTRACT

A push pull chain is provided with chain links that are connected to each other by respectively one chain joint, designed in a space-efficient manner. The chain joints of a first chain section with their joint axes have a first orientation, whereby the joint axes of the chain joints of a second chain section are arranged in a second orientation that is twisted around the longitudinal axis of the push pull chain or whereby they can be set to this orientation. In addition, a pertaining chain drive is provided.

13 Claims, 4 Drawing Sheets

(56) References Cited

U.S. PATENT DOCUMENTS

| | | | |
|---|---|---|---|
| 3,394,608 A | | 7/1968 | Johnson |
| 3,748,917 A | * | 7/1973 | Berg .................... F16G 1/22 |
| | | | 474/153 |
| 3,821,906 A | * | 7/1974 | Berg .................... F16G 1/22 |
| | | | 474/153 |
| 3,908,963 A | | 9/1975 | Bates et al. |
| 3,911,802 A | | 10/1975 | Morden |
| 4,290,762 A | * | 9/1981 | Lapeyre ............... F16G 13/02 |
| | | | 198/852 |
| 4,382,349 A | * | 5/1983 | Dunphy ............... E05F 11/06 |
| | | | 49/325 |
| 4,459,124 A | | 7/1984 | Newton |
| 4,481,735 A | * | 11/1984 | Jentoft ................. E05F 11/06 |
| | | | 49/139 |
| RE32,941 E | * | 6/1989 | Newton ............... F16G 13/02 |
| | | | 474/206 |

FOREIGN PATENT DOCUMENTS

| | | |
|---|---|---|
| FR | 999 751 A | 2/1952 |
| JP | 2000-304113 A | 11/2000 |
| JP | 2002-106647 A | 4/2002 |
| TW | 200923229 A | 6/2009 |
| WO | 2011/126386 A1 | 10/2011 |

OTHER PUBLICATIONS

Office Action in Taiwanese Patent Application No. 104115056, dated Sep. 5, 2016.

* cited by examiner

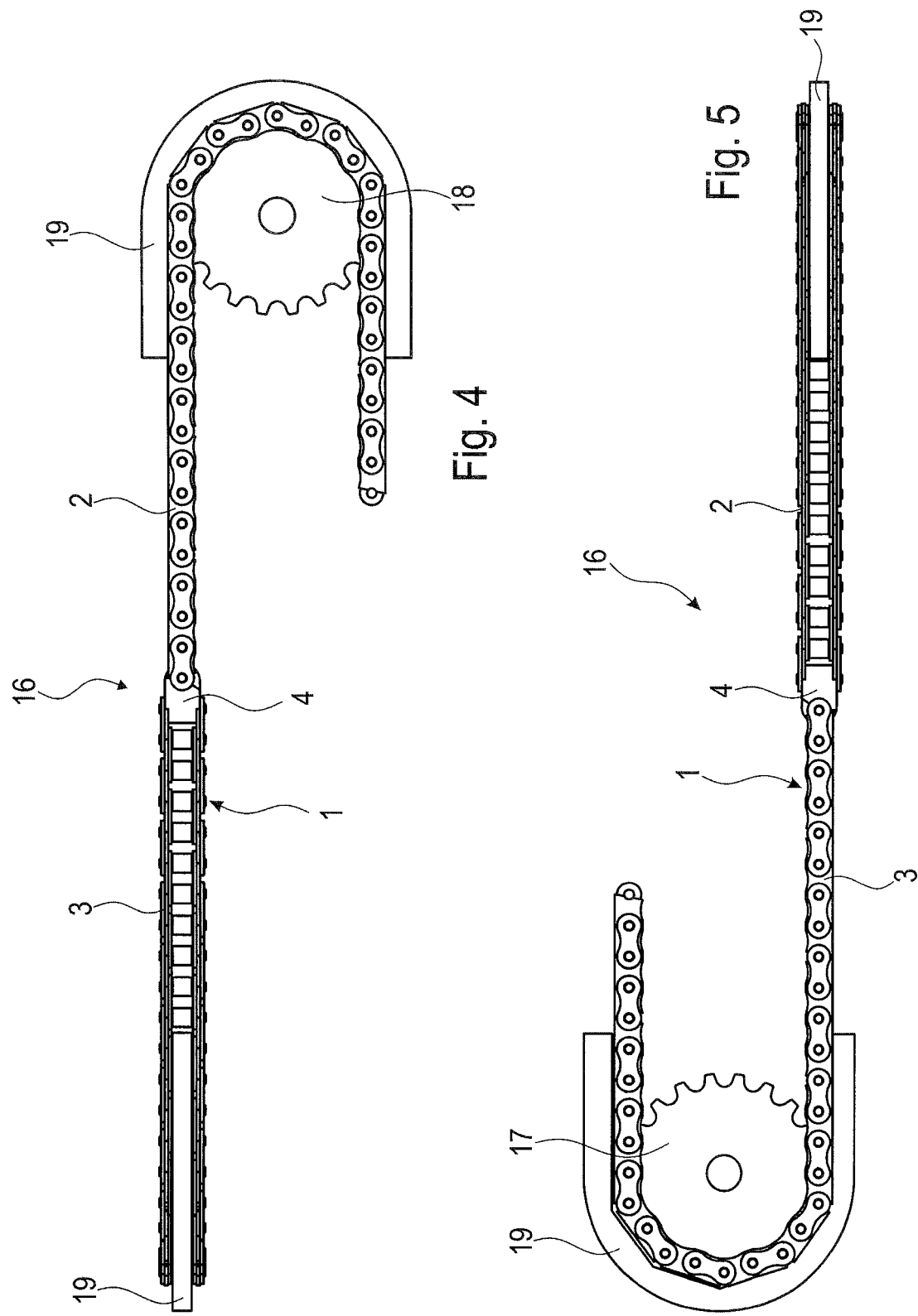

3D PUSH PULL CHAIN

CROSS-REFERENCE TO RELATED APPLICATION

This application claims priority to foreign European patent application No. EP 14001818.5, filed on May 23, 2014, the disclosure of which is incorporated by reference in its entirety.

FIELD OF THE INVENTION

The present invention concerns a push pull chain with chain links that are connected to each other respectively by one chain joint.

BACKGROUND

Push pull chains can be found in diverse forms in the state of the art. In most cases, they are plate-link chains with alternating internal and external chain links that are connected by means of a chain joint. The internal and/or external plate links or special stiffening brackets (links) are shaped in a way that the chain can be made bend-proof in one swivel direction of the chain joint. This is ensured for a lineally guided (straight) chain or slightly over-swiveled chain joints so that thrust powers can be subsequently transmitted. The chain joints can still be swiveled in the other swivel direction and the chain can be guided accordingly, i.e. around a chain wheel. Also the drive of such a chain is generally ensured by means of a chain wheel. Of course, these chains can usually also transmit traction forces. Push pull chains which belong to the class of anti-backbend chains are used, for example, in door locking systems, window lifting systems etc. The use of push pull chains occasionally requires more space especially if the chain is to be rolled up for the purpose of storage or for the drive. In some cases, this space requirement hampers the use of push pull chains.

SUMMARY OF THE INVENTION

Hence, the purpose of the present invention consists of providing a push pull chain of the type mentioned initially, which can be used more flexibly and which allows for a greater storage leeway.

This problem is solved by the invention due to the condition that the joint axes of chain joints of a first chain section have a first alignment and that the joint axes of the chain joints of a second chain section are installed in a second alignment, that is twisted around a longitudinal axis of the push pull chain, or that they can be set into this twisted alignment.

Thanks to this distribution, the push pull chain can be divided for example into a driven part and an operational part which are guided towards each other in a different twisting direction in relation to the longitudinal chain axis. Hence, the chain can not only be guided and rolled up in one plane, but be positioned at least in two different planes. The level of flexibility of a push pull chain has been two-dimensional up to present. Through the proposed solution, the level of flexibility of the push pull chain is extended by at least one dimension in a thrust and traction direction. This enables the implementation of complex kinematic structures. The flows of force in these kinematics can be transmitted in traction as well as in thrust directions. Especially the compactness of drives for the push pull chain is extended by one dimension as the storage of the push pull chain in a drive is now independent of the operational direction of the chain. For example, the operational direction could be aligned perpendicularly to the roll-up or insertion plane of the push pull chain in the drive.

The first chain section and the second chain section are preferably connected to each other by means of a linking piece that predetermines or that can trigger the twist. The linking piece can either predetermine a fixed twisting angle or provide several twisting angles, also in a stepless manner.

In another design variant, each chain section is planned to comprise internal and external chain links that are interconnected in an alternating way by means of respectively one chain joint, whereby each chain joint shall consist of a chain bolt of the external chain link and a sleeve (bush or bushing) of the internal chain link. This is the most common structure of a link chain. The chain bolts are respectively guided in the sleeves in a rotatable manner.

The linking piece can conveniently have a first junction point for the connection with the first chain section and a second junction point for the connection with the second chain section and the junction points can twist the first and the second chain section in an angle ranging from 30° to 150°, preferably 60° to 120°, especially 90°, towards each other. Therefore, it can be adapted to the particular drive situation and the suitable angle can be chosen whereby the angle of 90° has a special significance.

Alternatively, the linking piece can have a first junction point for the connection with the first chain section and a second junction point for the connection with the second chain section, whereby the first and the second junction points are arranged twistably towards each other by means of a rotary joint installed in between. Such a design variant offers the possibility of using the same push pull chain for a variety of drive situations in which different twisting angles are required. In addition, there is the possibility to start twisting only during the guiding process of the push pull chain.

In another design variant, the linking piece is planned to have two holes as junction points in which there is respectively one chain bolt of the internal chain link. Thereby, the chain bolt may be pivotably received or fixedly fastened in the holes. This depends essentially on whether the linking piece is also meant to be deflected. In addition, fixedly fastened chain bolts do not require a respective stiffening contour on the linking piece.

Alternatively or in addition, the linking piece can have a stiffening contour for the first chain section and/or a stiffening contour for the second chain section. This is particularly suitable in cases where the linking piece should be guided relatively closely to the deflection point.

If a push pull chain is required that also supports more complex kinematic structures, more than two chain sections can be installed out of which at least two are aligned in a twisted position towards each other or can be set to this twisted alignment towards each other. There is a variety of combination possibilities in this context. Either all chain sections can respectively be arranged in a twisted position towards each other or chain sections, that are to be installed separated from each other in the chain sling, can have the same twisting orientation whereas at least one other chain section has an orientation that is twisted in relation to the first one.

In another design variant, the linking piece is designed to work as a functional component with an additional feature to transmit force in the longitudinal chain direction. This shall refer to features that have an activating or moving effect on elements that are mostly independent of the chain. The linking piece could be used, for instance, as an opening or closing slider for a door or a window.

Besides, the invention also refers to a chain drive with a push pull chain according to one of the claims 1 to 9, a drive that meshes with the first chain section and a deflector system that meshes with the second or further chain section and that deflects the second or further chain section. The push pull chain is used as a 3D chain and can consequently be deflected and/or guided in two different spatial planes. This offers the possibility, for example, to arrange the chain section that interacts with the drive in a space-efficient manner so that less voluminous structures are required. This enables, for instance, the installation in a plane that is arranged perpendicularly to the operating direction of a second or further chain section.

The deflector system can preferably be a chain wheel and/or a guideway and/or a tension rail. This provides a variety of creative margins for a space-efficient installation.

BRIEF DESCRIPTION OF THE DRAWINGS

In the following, the invention is explained in greater detail by means of a drawing. It shows:

FIG. 4 the chain drive from FIG. 3 in a top view,

FIG. 5 the chain drive from FIG. 3 in a front view and

DETAILED DESCRIPTION

Figure 1:
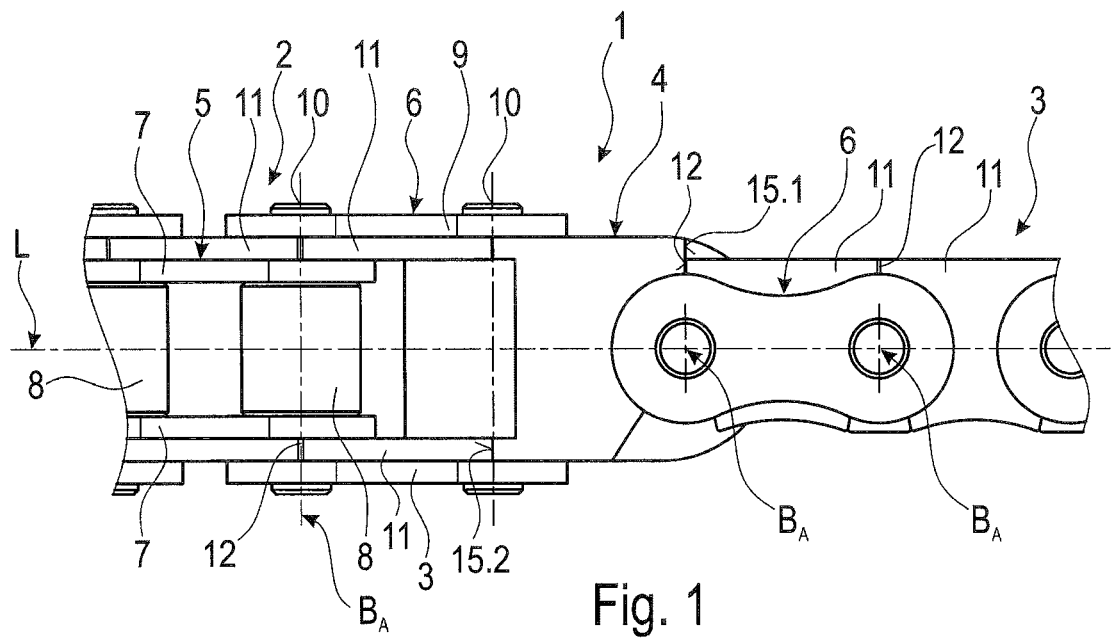
FIG. 1 a section of a push pull chain according to the invention.

The push pull chain 1 shown in FIG. 1 comprises a first chain section 2 and a second chain section 3 that are connected to each other in a twisted way around the longitudinal axis L of the push pull chain 1 by means of a linking piece 4 installed in between.

The first and the second chain section 2 and 3 respectively consist of alternatingly interconnected internal and external chain links 5 and 6.

Each internal chain link 5 consists of two internal plate links 7 arranged in parallel and two plate links, not shown in the figure, that connect these plate links with each other. A roll 8 is installed rotatably on each of the sleeves.

Each external chain link 6 consists of external plate links 9 that are arranged in parallel and at a distance to each other and of chain bolts 10, installed in the spacing division of the chain 1, that connect these plate links to each other. Therefore, the chain bolts 10 are pressed into the external plate links 9 in appropriate apertures.

To form a chain joint, a chain bolt 10 of the external chain link 6 extends respectively through a sleeve of the internal chain link 5.

Stiffening brackets (stiffening links) 11 are arranged between the internal plate links 7 and the external plate links 9. Their contour is designed in a way as to encompass a part of the external circumference (approx. 157.5°). The stiffening brackets 11 each have a stop surface 12. Adjacent stop surfaces 12 come in contact in case of a straight chain guide (this corresponds to a support angle of 0°, but a deviation of up to +5° or −5° is also possible) and hence lead to a stiffening effect in one direction while the respective chain section 2 and 3 can bend in the other direction by up to approx. 45° due to the contour of the stiffening brackets 11.

The first and the second chain section 2, 3 are twisted in relation to each other by an angle of 90° so that the pertaining chain bolt axes are also aligned perpendicularly to each other. The chain bolt axes of the first chain section 2 are arranged in parallel to each other and the chain bolt axes of the second chain section 3 are respectively installed in parallel to each other. The external and internal chain links 6, 5 are preferably made of a steel material.

Figure 2:
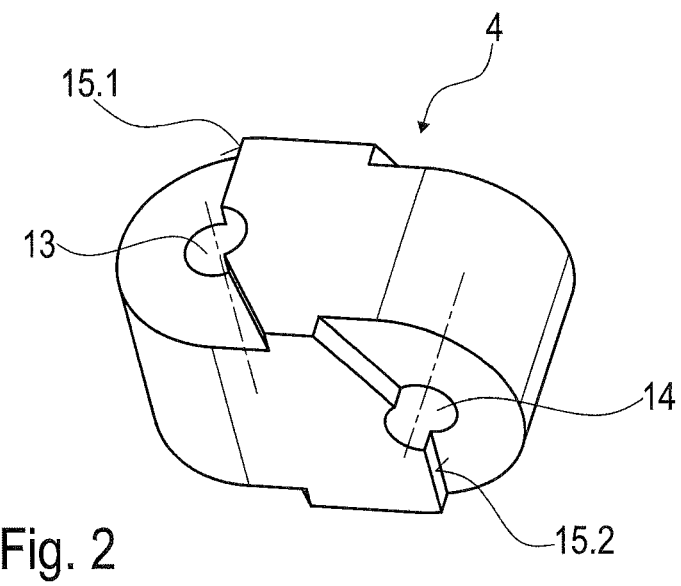
FIG. 2 the linking piece from FIG. 1 in a perspective view.
Figure 3:
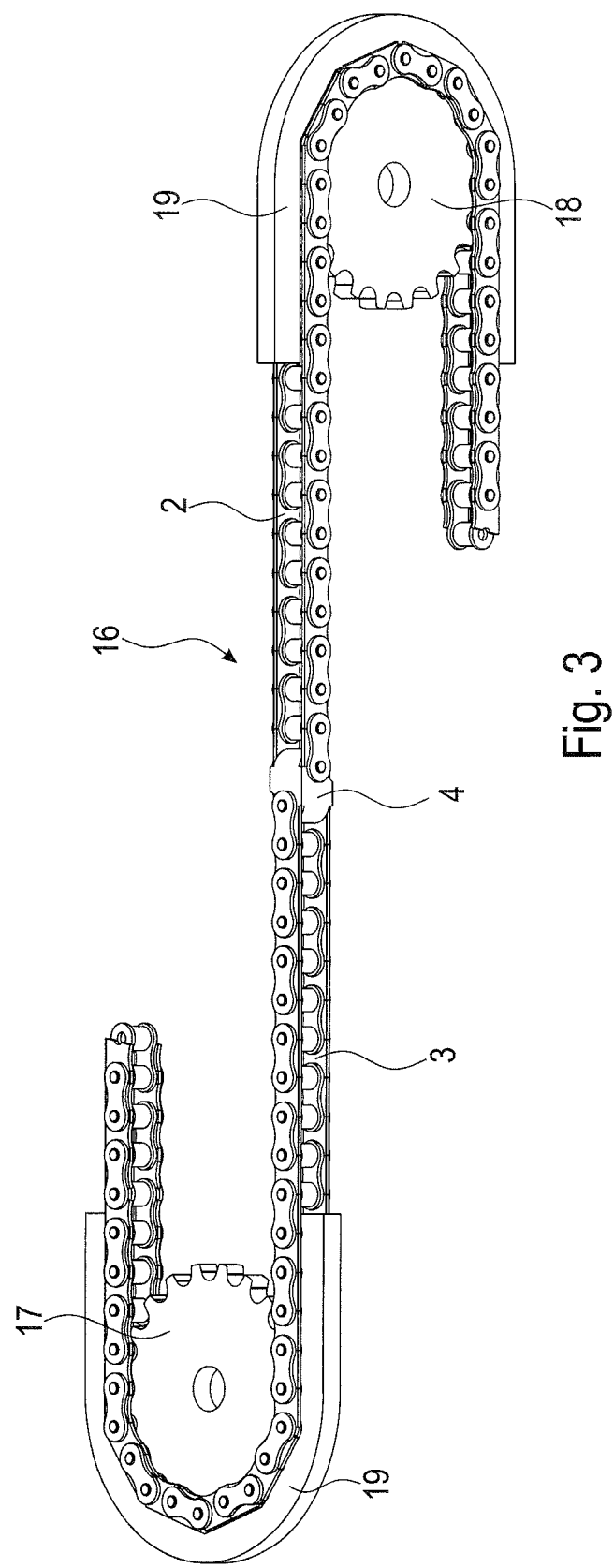
FIG. 3 a perspective view of a chain drive according to the invention.
Figure 6:
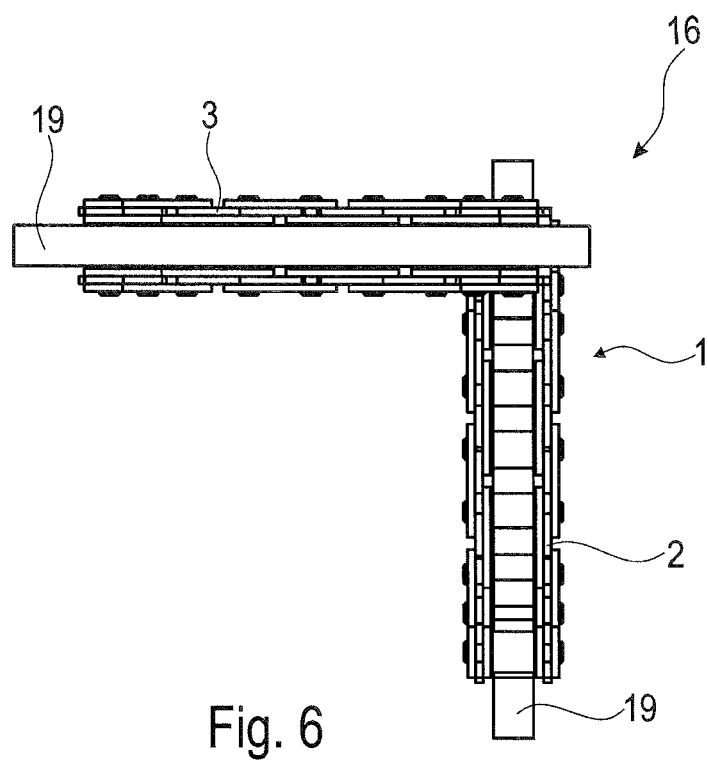
FIG. 6 the chain drive from FIG. 3 in a lateral view.

Now, the linking piece 4 shall be explained in greater detail by means of FIG. 2. The linking piece 4 has two holes 13 and 14 that are twisted in relation to each other by an angle of 90° and in the spacing division of the chain 1. A chain bolt 10 of the first chain section 2 extends through the hole 13 and a chain bolt 10 of the second chain section 3 extends through the hole 14. In the present case, the linking piece is a massive metal piece, e.g. made of steel or aluminum. The width of the linking piece 4 is designed in a way that it aligns with the outer surfaces of the stiffening brackets 11. The respective front areas are rounded cylindrically. Stop surfaces 15 shall be developed on the linking piece 4 that can come in contact with the respective stop areas 12 of the pertaining stiffening brackets 11. The respective contact surfaces 15.1 and 15.2 always extend only from the associated hole 13, 14 up to the outside. The contouring on the opposite side is designed in a way that an appropriate bend of the chain 1 continues to be possible.

In the following, ways of using the push pull chain 1 according to the invention in a chain drive shall be explained in greater detail by means of the FIGS. 3 to 6.

The chain drive 16 comprises two chain wheels 17, 18 whose axes are perpendicular to each other and at a distance from each other. Also, each of the chain wheels 17, 18 is associated with a U-shaped guiding 19 on the outside. The figures show very clearly that the push pull chain 1 is not only positioned in one plane but in a three-dimensional space. This provides different driving and installation possibilities and the chain can be used both in a thrust as well as in a traction mode. This is particularly advantageous if each chain section 2, 3 has a different function. For example, the second chain section 3 can predetermine an operating direction for the chain. Therefore, the second chain section 3 does not have to be led completely around an associated chain wheel 17, but a 90° deflection could also be sufficient. Due to this, thrust forces in a perpendicular direction to the plane, spread out by the first chain section 2, can also be applied. The drive function for the entire strand can be attributed to the first chain section. The chain wheel 18 would then be responsible for both the thrust as well as for the traction forces as a drive. This would also come with the possibility of positioning the chain in another plane. For example, the chain could be rolled up in the drive area or stored space-efficiently, i.e. in a straightened way, in the insert. Also here, it could be advantageous to guide the first chain section 2 around the push pull chain wheel 18 by only 90° so that the section of the first chain section 2 guided beyond could then be installed in a storage space perpendicularly to the plane that is spread out by the second chain section 3. Hence, there are spacing benefits due to the installation possibility in a perpendicular position to the operating direction.

The linking piece 4 can also be designed in a way that a rotary joint is arranged between the two holes 13, 14, so that any angle position of the two chain sections 2, 3 towards each other can be supported. However, there is also the possibility of limiting and/or fixing the twisting effect of the rotary joint. In addition, the linking piece 4 can also be designed as a functional component. This can be ensured, for example, by means of actuating additional elements by the chain drive 16 by means of the linking piece 4.

REFERENCE LIST

1 Push pull chain
2 First chain section
3 Second chain section
4 Linking piece
5 Internal chain link
6 External chain link
7 Internal plate links
8 Roll
9 External plate links
10 Chain bolt
11 Stiffening bracket
12 Stop surface
13 Hole
14 Hole
15.1, 15.2 Stop surface
16 Chain drive
17 Chain wheel
18 Chain wheel
19 Guiding system

The invention claimed is:

1. A push pull chain with chain links that are connected to each other by means of respectively one chain joint,
wherein the chain joints of a first chain section with their joint axes have a first orientation and that the joint axes of the chain joints of a second chain section are arranged in an orientation that is twisted around a longitudinal axis, and
wherein each chain section comprises internal and external chain links that are alternatingly interconnected by means of one respective chain link, whereby the chain links each consist of a chain bolt of the external chain link and a sleeve of the internal chain link.

2. The push pull chain according to claim 1, wherein the first chain section and the second chain section are interconnected by means of a linking piece that predetermines or triggers the twisting effect.

3. The push pull chain according to claim 1, wherein the linking piece has a first junction point for the connection with the first chain piece and a second junction point for the connection with the second chain section and that the junction points twist the first and the second chain section in an angle in the range of 30°-150°, preferably 60°-130°, especially 90°, towards each other.

4. The push pull chain according to claim 1, wherein the linking piece has a first junction point for the connection with the first chain section and a second junction point for the connection with the second chain section, whereby the first and the second junction point are arranged twistably to each other by means of a rotary joint installed in between.

5. The push pull chain according to claim 1, wherein the linking piece has two holes as junction points, whereby each is equipped with the chain bolt of the external chain links.

6. The push pull chain according to claim 1, wherein the linking piece has a stiffening contour for the first chain section or a stiffening contour for the second chain section.

7. The push pull chain according to claim 1, wherein more than two chain sections are to be installed out of which at least two have a twisted orientation towards each other or can be set to this twisted orientation towards each other.

8. The push pull chain according to claim 1, wherein the linking piece is designed as a functional component with an additional feature for the transmission of force in the longitudinal chain direction.

9. A chain drive with a push pull chain according to claim 1, comprising a drive that meshes with the first chain section and a deflector system that meshes with the second or further chain section and that deflects the second or further chain section.

10. The chain drive according to claim 9, wherein the deflector system comprises a chain wheel.

11. The chain drive according to claim 9, wherein the deflector system comprises a guideway or guide rail.

12. The push pull chain according to claim 1, wherein the linking piece has a stiffening contour for the first chain section and a stiffening contour for the second chain section.

13. A push pull chain with chain links that are connected to each other by means of respectively one chain joint,
wherein the chain joints of a first chain section with their joint axes have a first orientation and that the joint axes of the chain joints of a second chain section are arranged such that they can be set to an orientation twisted around a longitudinal axis, and
wherein each chain section comprises internal and external chain links that are alternatingly interconnected by means of one respective chain link, whereby the chain links each consist of a chain bolt of the external chain link and a sleeve of the internal chain link.

\* \* \* \* \*